March 26, 1968 L. BRUEHL 3,375,506

MAGNETIC DRUM ASSEMBLY WITH AIR BEARINGS

Filed June 15, 1961 4 Sheets-Sheet 1

INVENTOR
LAWRENCE BRUEHL

BY Paul D. Carmichael

ATTORNEY

MAGNETIC DRUM ASSEMBLY WITH AIR BEARINGS

Filed June 15, 1961 4 Sheets-Sheet 2

March 26, 1968 L. BRUEHL 3,375,506

MAGNETIC DRUM ASSEMBLY WITH AIR BEARINGS

Filed June 15, 1961 4 Sheets-Sheet 3

3,375,506
Patented Mar. 26, 1968

3,375,506
MAGNETIC DRUM ASSEMBLY WITH AIR BEARINGS

Lawrence Bruehl, Vestal, N.Y., assignor to International Business Machines Corporation, New York, N.Y., a corporation of New York Filed June 15, 1961, Ser. No. 117,461
18 Claims. (Cl. 340—174.1)

This invention relates generally to improvements in magnetic drums of the type having a magnetizable surface for storing information quantities to be used in a data processing system or the like. More particularly, the invention relates to a magnetic drum assembly comprising improved means for supporting the magnetic drum during rotation thereof.

In the art of electronic data processing a rotatable drum having a magnetizable periphery is commonly used for storage or memory purposes. The magnetic drum is rotated at a relatively high speed and electromagnetic transducer heads are positioned in closely adjacent relation with the magnetizable periphery to record or sense information quantities thereon. The magnetic drum is conventionally shaped in the nature of a cylinder and must be accurately mounted or supported for rotation at a relatively high speed.

In many applications mechanical bearings are employed for rotatably supporting a magnetic drum from a support member about which the magnetic drum rotates. Such a supporting arrangement is disclosed and shown in the co-pending application of William R. Maclay, Ser. No. 843,407, filed Sept. 30, 1959, entitled, "Magnetic Drum" now Patent No. 3,174,152 which is assigned to the assignee of the present invention. In other applications a magnetic drum is supported from a support member by fluid bearings. The space between the support member and the magnetic drum is filled with fluid under pressure, such as air, for example, from an external source thereof to form a fluid bearing for counteracting the gravitational and centrifugal forces on the rotating magnetic drum. The present invention is primarily concerned with a magnetic drum assembly wherein fluid bearings are used to rotatably support the magnetic drum at the operating speed.

A magnetic drum assembly employing fluid bearings to support the magnetic drum offers many advantages under certain operating conditions. For example, this type of magnetic drum assembly may be employed in nuclear radiation or chemical environments. The nuclear radiation or chemical action breaks down and disintegrates the lubricants associated with mechanical bearings which results in unsatisfactory operation of a magnetic drum supported by such bearings. In addition, fluid bearings are used with a magnetic drum that is to be rotated at an extremely high speed. Fluid bearings obviate many of the mechanical problems encountered in properly supporting a magnetic drum for rotation at a high speed and in maintaining the proper spacing between the magnetic drum and the transducer heads. While the advantages of fluid bearings for supporting a rotating magnetic drum are well known, the same have not been widely adapted due in part to the necessity of providing an expensive and space consuming external source of fluid under pressure and ancillary control equipment. Further, the prior art apparatus of this type has not been able to operate properly when severe shock forces are applied to the magnetic drum assembly.

Briefly, the present invention relates to a magnetic drum assembly and particularly to a magnetic drum assembly wherein fluid bearings are used to support the rotating magnetic drum. A plurality of impellers or fan blade assemblies are mounted from and rotate with the magnetic drum. These impellers, in combination with various passageways and pressure chambers, provide a source or sink of fluid under pressure internal to the magnetic drum assembly. The fluid under pressure is forced into thin spaces between the magnetic drum and a support member to provide the fluid bearings. Both longitudinal and end thrust fluid bearings are provided without the need of an external source of fluid under pressure and the complicated control equipment usually associated therewith.

The magnetic drum comprises a pair of longitudinally spaced and identical end sections which are mounted in symmetrical relation on opposite sides of the drive means for rotating the same. Various passageways are provided which interconnect the high and low pressure chambers associated with the opposite end sections of the magnetic drum to provide a means for automatically centering the magnetic drum. When the magnetic drum is moved longitudinally, in response to a shock force, for example, cooperating metering orifices are opened and closed whereby a restoring force is developed which moves the magnetic drum back to its centered position.

The magnetic drum assembly is provided with retractable means for supporting the magnetic drum when it is at rest or is operating at a speed less than that required to generate sufficient fluid pressure for the fluid bearings (during starting and stopping of the magnetic drum, for example). Each end section of the magnetic drum has a high pressure chamber associated therewith having a movable end wall which moves in response to the pressure existing in the chamber. The retractable means for supporting is interconnected with the movable end walls and is retracted when the pressure in the high pressure chambers is sufficient to provide the fluid bearings for the magnetic drum. The transducer heads are raised and lowered in response to movements of the movable end walls. During starting and stopping operations the transducer heads are raised but during normal operation the same float on the laminar boundary of fluid about the outer periphery of the magnetic drum.

A certain portion of the fluid under pressure in each of the high pressure chambers is allowed to escape. The escaping fluid under pressure is channeled to and cools the various heat radiating electronic components or modules mounted in concentric relation with respect to the magnetic drum.

It is the primary or ultimate object of the present invention to provide a magnetic drum assembly wherein the magnetic drum is supported for rotation at the operating speed by fluid bearings and the fluid under pressure is generated internally of the magnetic drum assembly. A plurality of fan blade assemblies or impellers are mounted for rotation with the magnetic drum and, in combination with various passageways and chambers, define a source of fluid under pressure internal to the magnetic drum assembly.

Another object of the invention is to provide a magnetic drum assembly wherein the magnetic drum is disposed in symmetrical relation on opposite sides of the drive means for rotating the same. The magnetic drum comprises a pair of identical end sections which are mounted and rotatable with the rotor of a drive motor. An extremely stable and well balanced magnetic drum assembly is provided.

Another object of this invention is to provide a magnetic drum supported by fluid bearings wherein means are incorporated for automatically centering the magnetic drum even when large shock forces are applied to the same. The high and low pressure chambers associated with the end sections of the magnetic drum are interconnected by passageways and the plurality of impellers to define a series fluid circuit. Cooperating metering orifices in this series fluid circuit open and close in response to longitudinal movement of the magnetic drum whereby fluid forces are developed which restore the magnetic drum to its centered position. Restoring forces are also developed by passing fluid through the slot between the rotor and stator of the drive motor in response to a pressure differential on the opposite sides of the motor.

Yet another object of the invention is to provide a magnetic drum assembly of the type employing fluid bearings for supporting the magnetic drum wherein mechanical means for supporting the magnetic drum are automatically retracted when the same is operating at a speed sufficient to develop the fluid pressure required to provide the fluid bearings. In connection with this object of the invention, the transducer heads which ride on the laminar film of fluid about the outer periphery of the magnetic drum are automatically raised or lowered in response to the pressure of the fluid generated by and/or the speed of rotation of the magnetic drum.

A further object of the invention is to provide a magnetic drum assembly having means rotatable with the magnetic drum for providing a source of fluid under pressure wherein a portion of the fluid under pressure is channeled to electronic components or modules mounted in adjacent relation with respect to the magnetic drum for cooling the same. A controlled amount of the fluid under pressure is allowed to escape from the high pressure chambers and is caused to flow over the various electronic components or modules.

A still further object of the invention is to provide a magnetic drum assembly of the character above described which is extremely rugged and is adapted to operate at high speeds. The magnetic drum assembly operates successfully under environmental conditions where prior art apparatus of the same general character could not be employed.

Yet a further object of the invention is to provide a magnetic drum assembly which is characterized by its small size, low weight, high operating speed and simplicity of construction and operation.

The foregoing and other objects, features and advantages of the invention will be apparent from the following more particular description of a preferred embodiment of the invention as illustrated in the accompanying drawings.

Figure 1:
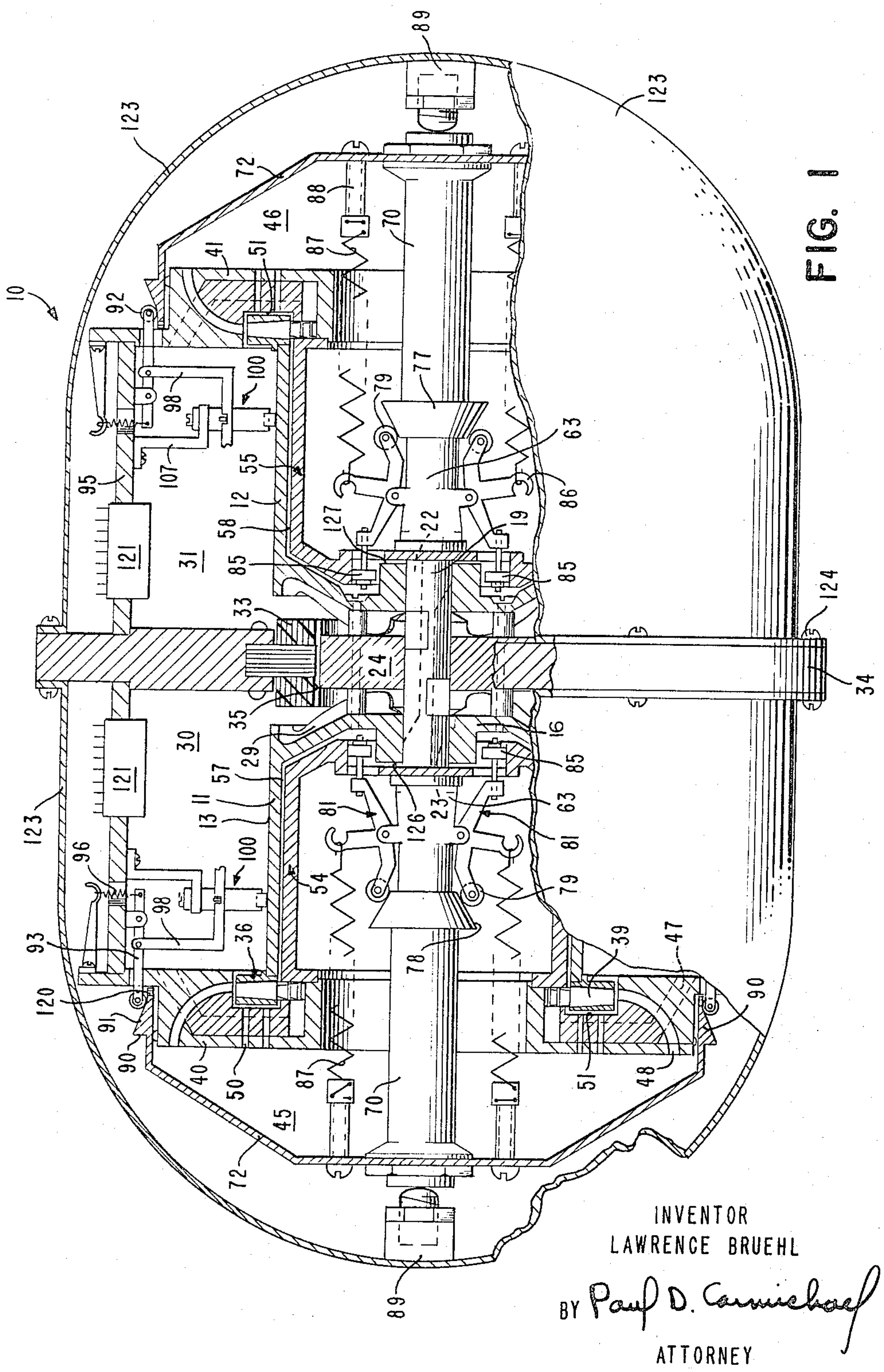
FIGURE 1 is a longitudinal side sectional view of a magnetic drum assembly constructed in accordance with the teachings of the present invention.
Figure 2:
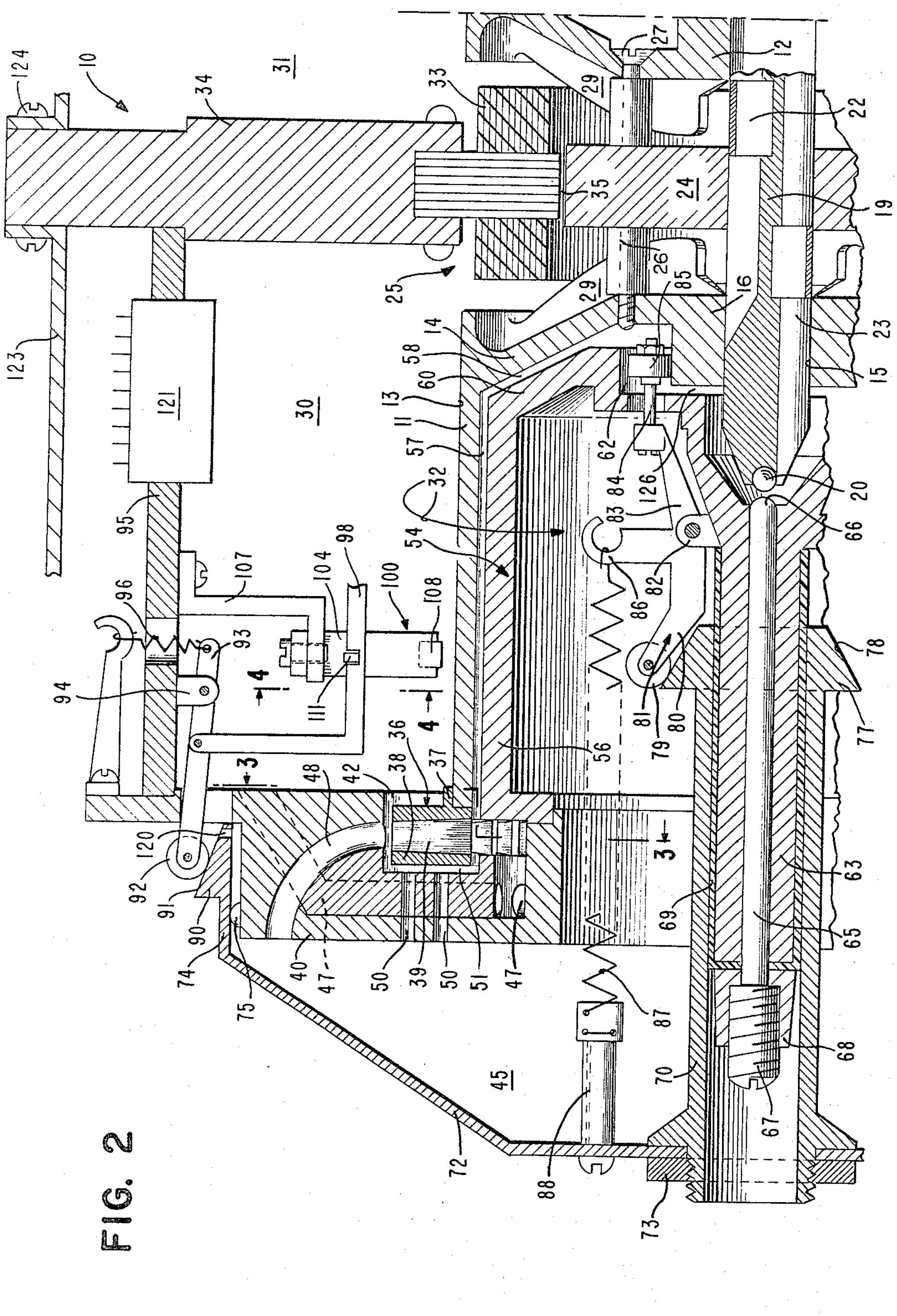
FIGURE 2 is an enlarged longitudinal sectional view of a portion of the magnetic drum assembly shown in FIGURE 1 with the magnetic drum supported by the retractable mechanical supporting means and the transducer heads in the raised or retracted positions.
Figure 4:
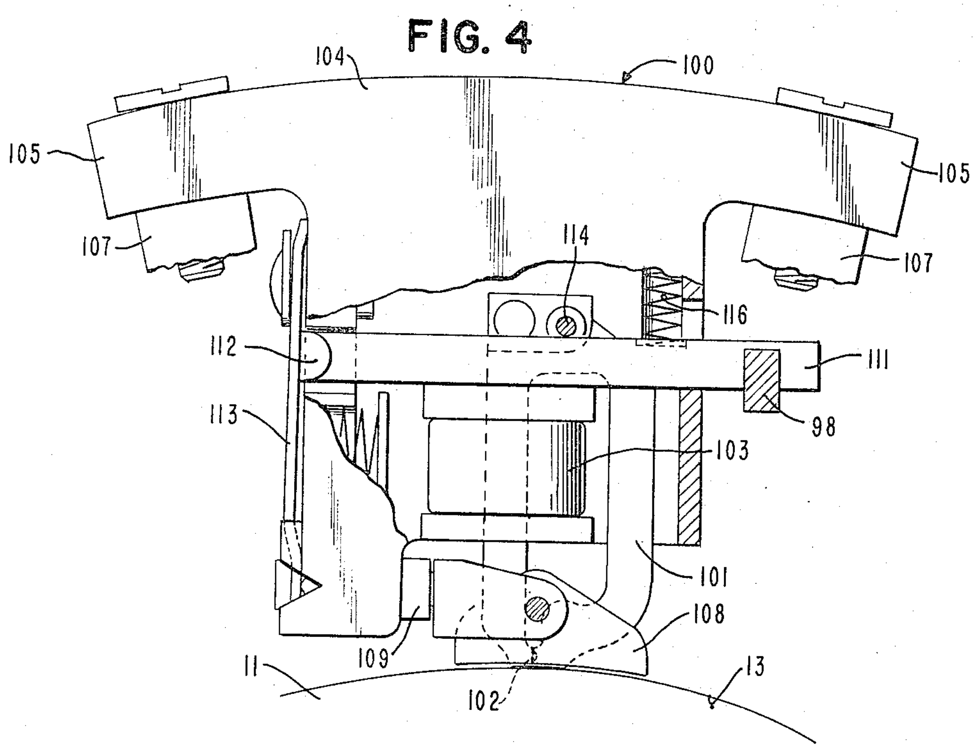
Figure 5:
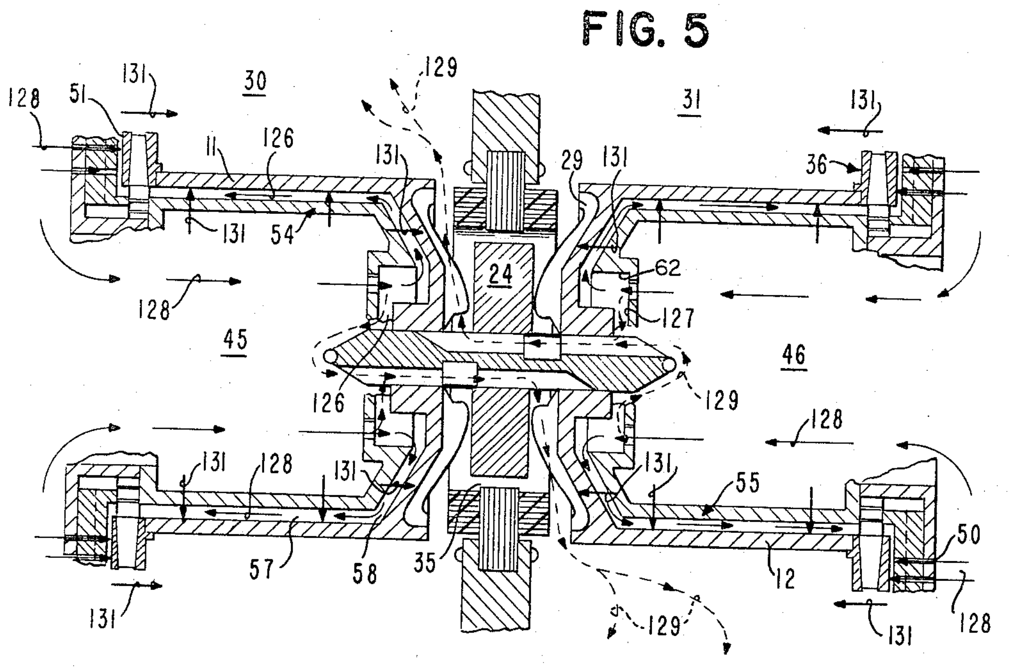
Figure 6:
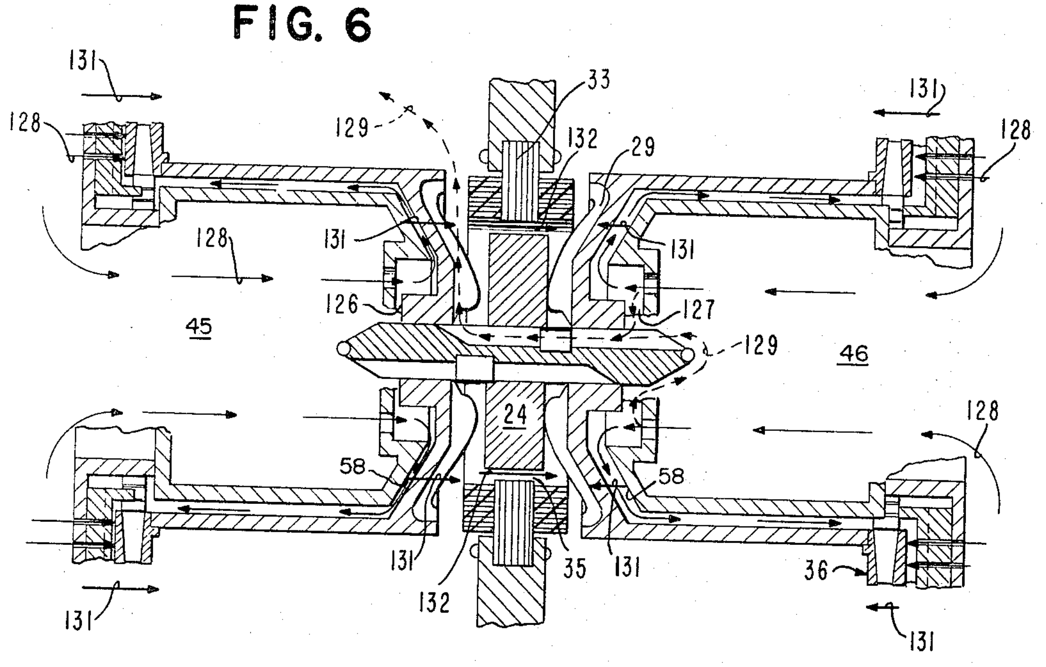

FIGURE 4 is a side view, partially in section, of a transducer head of a type which may be employed in connection with the magnetic drum assembly taken generally along the section line 4—4 of FIGURE 2; and FIGURES 5 and 6 are schematic longitudinal sectional views similar to FIGURE 1 showing particularly the fluid flow and forces occurring at various times during the operation of the magnetic drum assembly.

Figure 3:
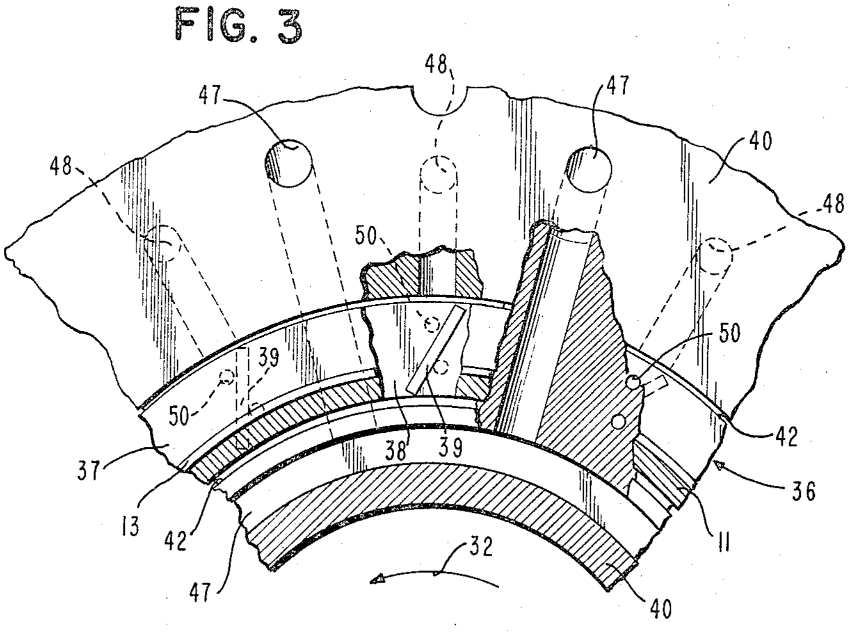
FIGURE 3 is a fragmentary end sectional view taken generally along the section line 3—3 of FIGURE 2.

Referring now to the drawings, and initially to FIGURES 1–3 thereof, the magnetic drum assembly of the present invention comprises a magnetic drum generally designated by the reference numeral 10. The magnetic drum 10 is formed by a pair of identical end sections 11 and 12. Each of the end sections 11 and 12 is substantially cylindrical in shape and has a magnetizable outer surface 13 so that the magnetic drum may perform its intended function as a magnetic storage medium in an electronic data processing system. One end of each end section is open while the other end thereof is formed by a tapering end wall 14 having a central aperture 15 therein. The end wall 14 is provided with an outwardly directed annular flange 16 whose use will be hereinafter more fully apparent.

The end sections 11 and 12 of the magnetic drum are disposed in inwardly facing spaced relation with the end walls 14 positioned adjacent to each other. A cylindrical shaft 19 interconnects the end sections 11 and 12 and is tightly received within apertures 15 in the end walls 14 thereof. The ends of the shaft 19 are tapered and recessed to rotatably journal balls 20. The shaft 19 is formed with a pair of generally longitudinally extending and offset crossover passageways 22 and 23 which interconnect the opposite sides of the magnetic drum assembly in a manner to be further explained.

Rigidly mounted on the shaft 19 between the end walls 14 of the end sections 11 and 12 of the magnetic drum is an annular rotor 24 of a drive motor 25. The end sections of the magnetic drum and the rotor are maintained in axially aligned and assembled relation by a plurality of spacers 26 and circumferentially spaced and longitudinally extending tie rods 27. The arrangement is such that the end sections 11 and 12 of the magnetic drum, the shaft 19 and the rotor 24 of the drive motor 25 define a rotating assembly and rotate as a unit.

Extending inwardly toward the drive motor 25 from the end wall 14 of each end section are a plurality of blades 29. The blades 29 are spaced circumferentially about the end walls between the spacers 27 to define a pair of impellers. The blades are properly contoured so that fluid is drawn from the crossover passageways 22 and 23 and forced outwardly into generally cylindrical low pressure chambers 30 and 31 when the magnetic drum is rotated in the direction represented by the arrows 32.

An annular stator 33 of the drive motor 25 is rigidly and stationarily supported by a dividing member 34. The dividing member 34, the stator 33, rotor 24 and shaft 19 define a means for separating the low pressure chambers 30 and 31 associated with the end sections 11 and 12, respectively, of the magnetic drum. The rotor 24 and stator 33 of the drive motor 25 are magnetically coupled and a thin circumferential slot 35 exists between these moving and stationary parts which does interconnect the low pressure chambers 30 and 31. When the pressure is the same in both of the low pressure chambers, fluid will not flow through the thin motor slot 35. However, when there is a fluid pressure differential between the low pressure chambers 30 and 31, fluid will flow through the motor slot 35. The flow of fluid through the motor slot 35 generates a restoring force due to the friction between the fluid and the side walls of this slot which tends to recenter the magnetic drum with respect to the supporting structure therefor.

Mounted adjacent the open end of each end section of the magnetic drum is an impeller or rotor assembly 36. The impeller assembly 36 comprises a pair of annular and longitudinally spaced end portions 37 and 38 which are joined and spanned by plurality of circumferentially spaced blades 39. The impeller assemblies 36 are rigidly connected and rotatable with the end sections 11 and 12 of the magnetic drum. This arrangement is most clearly shown in FIGURE 3 of the drawings. While the end sections 11 and 12 are generally identical, the blades 39 of the pair of impeller assemblies 36 extend in oppositely angled relation with respect to each other as is required for the proper circulation of fluid within the magnetic drum assembly.

The inner and common end wall of the lower pressure chambers 30 and 31 is defined by the dividing member 34, the stator 33 and rotor 24 of the drive motor and the shaft 19 while the inner side walls thereof are provided by the outer peripheries of the end sections 11 and 12 of the magnetic drum as has been previously explained. The outer end walls of the low pressure chambers 30 and 31 are defined by a pair of stationarily mounted and block-like wall members 40 and 41. Each of the wall members 40 and 41 have an annular recess 42 extending about the inner periphery thereof which nestingly receives the impeller assembly 36. The impeller assemblies 36 move freely within the recesses 42 of the wall members 40 and 41 when the magnetic drum is rotated.

The wall members 40 and 41 also separate the low pressure chambers 30 and 31 from a pair of high pressure chambers 45 and 46 disposed at the outer ends of the magnetic drum assembly. Various passageways are provided in the wall members 40 and 41 for interconnecting the pairs of low and high pressure chambers (30–45 and 31–46) in series with the impeller assemblies 36. Each of the wall members 40 and 41 have a plurality of circumferentially spaced passageways 47 leading from the low pressure chamber behind the impeller assembly 36 to the inner periphery of the annular recess 42. Similar circumferentially spaced passageways 48 in the wall member extend between the high pressure chamber and the outer periphery of the annular recess 42. The ports of the passageways 47 and 48 in the recess 42 are disposed on opposite sides of the impeller assembly 36. The blades 39 are contoured or formed in such a manner that when the magnetic drum is rotated in the direction represented by the arrows 32, fluid is drawn from the low pressure chambers 30 and 31 through the passageways 47 to the inside of impeller assemblies 36 and forced outwardly through the passageways 48 to the high pressure chambers 45 and 46.

Also drilled or otherwise formed in the wall members 40 and 41 are a plurality of longitudinally extending and circumferentially spaced orifices 50. The orifices 50 extend from the high pressure chambers 45 and 46 to the ring-like spaces 51 between the outer side surfaces of the end portions 38 of the impeller assemblies 36 and the end walls of the recesses 42. When the magnetic drum is operating at the required rotational speed, the fluid under pressure is passed from the high pressure chambers to the spaces 51 and exerts forces directed against the outer surfaces of the end portions 38 of the impeller assemblies 36 to define outer end thrust bearings for the magnetic drum. As shown in FIGURE 3 of the drawings, the various passageways and orifices 47, 48 and 50 are spaced radially and circumferentially about the wall members 40 and 41 so that the same are not in direct communication with each other. Any number of such passageways and orifices may be provided as is required to affect proper circulation of the fluid from the low pressure chambers to the high pressure chambers and to the spaces 51. For convenience of manufacture the wall members 40 and 41 are shown to be fabricated from a plurality of block-like pieces.

The wall members 40 and 41 form the annular and flanged rear end portions of a pair of support members 54 and 55. The support members 54 and 55 each comprise a generally cylindrical main body portion 56 having a tapered inner end which is received in nesting relation within the internal opening of the end section of the magnetic drum associated therewith. The main body portion of the support member has an outer diameter which is slightly smaller than the internal diameter of the end section of the magnetic drum. The arrangement is such that a pair of generally normally related and circumferentially extending thin spaces 57 and 58 are provided for each of the end sections 11 and 12. The spaces 57 are defined by the inner peripheries of the end sections 11 and 12 and the outer peripheries of the main body portions 56 of the support members 54 and 55. The spaces 58 are disposed between tapered end walls 60 of the support members 54 and 55 and the end walls 14 of the end sections 11 and 12. The spaces 57 define longitudinal fluid bearings while the spaces 58 provide a pair of inner end fluid thrust bearings for the magnetic drum. These longitudinal fluid bearings counteract the gravitational and centrifugal forces exerted on the rotating magnetic drum. The main body portions of the support members 54 and 55 are generally coaxial, concentric and contiguous with the end sections 11 and 12 of the magnetic drum.

The end wall 60 of each support member has a plurality of apertures 62 therein which provide a means for introducing the fluid under pressure in the high pressure chamber to the spaces 57 and 58. The internal openings of the support members 54 and 55 form a portion of the high pressure chambers 45 and 46 as is readily apparent from FIGURES 1 and 2 of the drawings. When the magnetic drum is rotating at an operating speed, the same is supported by the longitudinal fluid bearings 57 and the end fluid thrust bearings 51 and 58.

Each of the support members 54 and 55 also comprises a projecting tubular rod 63 extending from the end wall 60. Received within the center opening of the tubular rod 63 is an elongated abutment rod 65 whose rounded inner end 66 is adapted to form a bearing surface for the ball 20. The outer end of the abutment rod 65 is enlarged and threaded to define a screw 67. A locking nut 68 is threadably received over the screw 67. The relative spacing between bearing surface 66 and the ball 20 is adjusted by turning the abutment rod 65. The bearing surfaces 66 of the abutment rods 65 limit longitudinal movement of the magnetic drum and provide a mechanical bearing override when excessive shock forces are applied to the magnetic drum assembly as will be hereinafter more fully explained.

An elongated bushing 69 formed of nylon or suitable plastic material, for example, is mounted over each tubular rod 63 of the support members 54 and 55. Slidably received on the bushing 69 is an annular sleeve 70 which is attached to an end cap 72. The end cap 72 and the annular sleeve 70 are maintained in assembled relation by a large locking nut 73. The end cap 72 is generally circular and dished in shape and a circumferential edge flange 74 projects inwardly from the outer periphery thereof. The flange 74 overlies the outer surface of the wall member 40 and is supported by a plurality of circumferentially spaced and radially projecting knobs 75. The end caps 72 and the annular sleeves 70 are slidably mounted with respect to the stationary wall members 40 and 41 and the tubular rods 63 of the support members 54 and 55, respectively. These end caps define movable walls for the high pressure chambers 45 and 46 at the outer ends of the magnetic drum assembly.

Carried at the inner end of each sleeve 70 is an annular cam 77 having a tapered camming surface 78. A cam follower roll 79 is rotatably mounted on a first arm 80 of a bell crank lever 81. The bell crank lever 81 is pivotally mounted by a clevis 82 from the stationary tubular rod 63 of the support member associated therewith. A second arm 83 of the bell crank lever 81 projects inwardly and mounts a rod 84 on which is journalled a roller bearing 85. A third arm 86 projects radially and defines a hook which anchors one end of a coil spring 87. The other end of the coil spring 87 is attached to the end cap 72 by an assembly 88 which allows adjustment of the coil spring. The coil spring 87 provides a biasing force that maintains the cam follower roll 79 in contact with the camming surface 78 of the annular cam 77.

The rod 84 extending from the second arm 83 of the bell crank lever 81 projects through one of the apertures 62 in the end wall 60 of the support member. The roller bearing 85 is supported in adjacent relation with respect to the bearing surface 16 defined by the annular flange of the end section of the magnetic drum. As shown in FIGURE 1 of the drawings, mechanical stops 89 are provided for limiting outward movement of the end caps 72. A plurality of the bell crank levers 81, roller bearings 85, coil springs 87 and the other apparatus associated therewith are provided for each end section of the magnetic drum. For example, six such assemblies may be disposed in circumferentially spaced relation about each of the tubular rods 63. These assemblies define a retractable means for supporting the magnetic drum when it is at rest and when it is operating at a speed less than that necessary to develop sufficient fluid pressure for the fluid bearings.

When the magnetic drum is not rotating, the end caps 72 are in their innermost positions since no appreciable fluid pressure exists in the high pressure chambers 45 and 46. As shown in FIGURE 2 of the drawings, the roller bearings 85 are positioned in rolling contact with the annular bearing surfaces 16. The coil springs 87 maintain the end caps 72 in their innermost positions and the cam follower rolls 79 in engagement with the camming surfaces 78. Each end section of the magnetic drum is supported in spaced relation with respect to the support member associated therewith by a plurality of the circumferentially spaced roller bearings 85 which engage the annular bearing surfaces 16.

As the magnetic drum is rotated, the pressure in the high pressure chambers 45 and 46 begins to build up and the end caps move outwardly against the forces exerted by the coil springs 87. The annular cams 77 are also carried outwardly whereby the cam follower rolls 79 are lowered and the roller bearings 85 move radially outward from the annular bearing surfaces 16. Eventually, the end caps 72 engage the mechanical stops 89 whereby the roller bearings 85 are fully retracted and the magnetic drum is completely supported by the fluid bearings. The shape of the annular camming surfaces 78, the bell crank levers 81 and the tension in the springs 87 are all designed and/or adjusted so that the roller bearings 85 are not retracted until sufficient fluid pressure has been developed in the high pressure chambers 45 and 46 to provide fluid bearings which are capable of fully supporting the rotating magnetic drum. The position of the various component parts when the drum is fully supported by the fluid bearings is shown in FIGURE 1 of the drawings.

If the speed of rotation of the magnetic drum is reduced below a preset level (during stopping operations, for example), the pressure of the fluid in the chambers 45 and 46 will decrease and the end caps 72 will move inwardly under the influence of the coil springs 87. At the same time, the roller bearings 85 converge radially and engage the annular bearing surfaces 16 when there is insufficient pressure to support the magnetic drum.

The above-described arrangement provides a means for mechanically supporting the magnetic drum which is retracted when the fluid is under sufficient pressure to provide air bearings capable of supporting the magnetic drum. An extremely simplified and advantageous automatic retracting means is provided in that the springs 87 regulate the inward and outward movements of the end cap 72 on one end and urge the cam follower rolls 79 into contact with the annular cams 77 on the other end. The speed, which is directly related to the pressure of the fluid in the chambers 45 and 46, at which the roller bearings 85 engage or are disengaged from the annular bearing surfaces 16 is varied by manipulating the adjustment assemblies 88 or replacing the annular cams 77 with cams having camming surfaces of the desired contour.

Carried on the inner ends of the edge flange 74 are circumferentially spaced and generally wedge-shaped cams 90 having camming surfaces 91. Associated with each of the cams 90 is a retracting assembly comprising a cam follower roll 92 which is rotatably mounted at the outer end of an operating lever 93. The operating lever 93 is pivoted between a clevis 94 extending from a cylindrical shell 95. The cylindrical shells 95 span the wall members 40 and 41 and the dividing member 34 to provide the outer side walls for the low pressure chambers 30 and 31. The rear end of the operating lever 93 is connected to a biasing spring 96 operative to maintain the cam follower roll 92 in engagement with the camming surface of the wedge-shaped cam 90. Attached to the operating lever 93 between the pivot point thereof defined by the clevis 94 and the cam follower roll 92 is an inwardly and radially extending generally L-shaped actuator 98.

A plurality of the operating mechanisms defined by the cams 90 and the linkages 93–98 are provided at circumferentially spaced points about the outer peripheries of both of the end caps 72. The arrangement is such that when the end caps move outwardly in response to the pressure of the fluid in the chambers 45 and 46, the actuators 98 are lowered. However, when the end caps 72 move inwardly to retracted positions, the actuators 98 are raised.

In the electronic data processing art it is common to arrange transducer heads in circumferentially spaced and longitudinally extending rows about the magnetizable surface of the magnetic drum. It is also conventional to use transducer heads which will float on a laminar film of fluid adhering to the surface of the rapidly moving magnetic drum. It is, of course, necessary to provide means for supporting the transducer heads when the magnetic drum is not rotating at a speed sufficient to generate a laminar film of fluid which will support the transducer heads.

A transducer head which may be employed in connection with the magnetic drum assembly is designated generally by the reference numeral 100 and is shown in more complete details in FIGURE 4 of the drawings. The transducer head comprises a core structure 101 having a gap 102 therein. An electrical coil 103 is disposed about one eg of the core structure 101. The core structure and the electrical coil are received in a housing 104 having the integral lugs 105 extending therefrom. The housing is mounted in fixed relation from one of the cylindrical shells 95 by mounting brackets 107 that are bolted to the lugs 105. The lower end of the core structure 101 is secured in a supporting shoe 108 having a bottom surface of relative large area curved to conform to the peripheral surface 13 of the magnetic drum. The shoe 108 is mounted for varying degreese of angular freedom by a gimbal structure 109.

Means are provided for moving the supporting shoe 108 and the core structure 101 away from the magnetizable surface 13 so that the friction of the shoe 108 bearing directly on the surface of the magnetic drum is eliminated and the torque required in starting the magnetic drum is substantially reduced. This head lifting means comprises a lifting bar 111 secured or mounted in the housing 104. The lifting bar 111 has a side projection 112 which is semicylindrical in shape and whose rounded side cooperates with a notch in the housing, not shown, to provide a pivoted connection. A flat spring 113 biases the projection 112 into its cooperating notch. When the lifting bar 111 moves upward above its pivot point, a rivet extension 114 is contacted and carries the core structure and supporting shoe upwards with it. A spring 116 biases the lifting bar 111 to its lower position. To retract the supporting shoe 108 and the core structure 109 a force need only be applied to the bottom of the lifting bar 111 to raise this arm upwards.

A more detailed description of the disclosed transducer head is to be found in the co-pending application of Harry Charnetsky, Jr. and William R. Maclay, Ser. No. 845,687, filed Oct. 12, 1959, now Patent No. 3,072,752, issued Jan. 8, 1963, entitled "Apparatus for Manifesting Intelligence on Record Media" which is assigned to the assignee of the present invention. It should be understood that the present invention is not limited to the use of any particular design of a magnetic transducer head.

The actuators 98 extend beneath the lifting bars 111 of the transducer heads 100 whereby when the pressure of the fluid in the high pressure chambers 45 and 46 is sufficient to move the end caps 72 outwardly, the supporting shoes 108 and the core structures 101 are lowered and the shoes are supported on the laminar film of fluid about the periphery of the rotating magnetic drum. However, when the end caps 72 are retracted inwardly, the actuators 98 and the lifting bars 111 are raised which causes the core structures and the supporting shoes to move away from the magnetizable surface 13 of the magnetic drum. The shape of the camming surfaces 91 and the tension of the springs 87 determine when or the speed of rotation of the magnetic drum at which the transducer heads are raised or lowered. The camming surfaces 91 and 78 of the cams 90 and 77 are individually designed to provide the correct operation for the transducer head retracting means and the retractable mechanical supporting means for the magnetic drum, respectively.

The edge flanges 74 of the end caps 72 are notched at various points about the peripheries thereof to define slots 120. The slots 120 provide a means for channeling a portion of the fluid under pressure in the high pressure chambers 45 and 46 to heat radiating electronic modules 121 mounted from the cylindrical shells 95 for cooling these latter elements. The spacing between the knobs 75 and the size of the solts 120 regulate or meter the amount of the high pressure fluid which is allowed to escape from the high pressure chambers whereby sufficient pressure is maintained in these chambers to provide the fluid bearings. The escaping fluid coming from the slots 120 flows across the electronic modules 121 to cool the same. It is common practice to mount electronic modules in spaced concentric relation about a magnetic drum.

The magnetic drum assembly is enclosed in a casing defined by a pair of housing halves 123. The housing halves 123 and the dividing member 34 are maintained in assembled relation by a plurality of bolts 124. The magnetic drum assembly is characterized by its small size and the low weight of the rotating assembly thereof.

Considering now the operation of the apparatus above described, it will be assumed that the magnetic drum of the magnetic drum assembly is rotating at an operating speed. At this time the roller bearings 85 are retracted and the magnetic drum is supported solely by the fluid bearings. The magnetic transducer heads are lowered and the supporting shoes 108 ride on the laminar film of fluid about the periphery of the magnetic drum. It will also be assumed that the rotating assembly defined by the end sections 11 and 12 of the magnetic drum, the rotor 24 of the drive motor 25 and the shaft 19 is centered with respect to the support members 54 and 55. This condition is shown in FIGURE 5 of the drawings.

The fluid bearings supporting the rotating assembly in both radial and axial directions are provided by the fluid under pressure flowing from the high pressure chambers 45 and 46 to the end spaces 51 via the orifices 50 and to the longitudinal spaces 57 and the end spaces 58 by way of the apertures 62. This fluid flow is represented by the solid lines 128 in FIGURE 5 of the drawings. It is noted that the fluid in the spaces 51, 57 and 58 may pass back to the impeller assemblies 36 for recirculation.

An auxiliary or centering fluid flow also takes place at this time as is indicated by the broken lines 129 in FIGURE 5. A portion of the fluid under pressure passing through the apertures 62 of the support member 54 associated with the end section 11 flows through a metering orifice 126, past the bearing surface 66 and ball 20 and through to the crossover passageway 23 in the shaft 19. This fluid is picked up by the rotating blades 29 of the end section 12 and forced upwardly into the low pressure chamber 31. In a similar manner a portion of the fluid passing through apertures 62 in the support member 55 flows through a metering orifice 127 (see FIGURE 1) to the crossover passageway 23. The fluid in the crossover passageway 23 is forced into the low pressure chamber 30 by the rotating blades 29 carried by the end section 11. The crossover passageways 22 and 23 and the metering orifices 126 and 127 form portions of passageway means interconnecting the low pressure chambers 30 and 31. The shaft 19 may be provided with a plurality of passageways to define this passageway means whereby the fluid is more evenly distributed with respect to the blades 29.

The impeller assemblies carried by the end sections 11 and 12 of the magnetic drum cooperate in series to circulate the fluid through the magnetic drum assembly. For example, fluid is drawn from the low pressure chamber 30 and forced by impeller assembly 36 to the high pressure chamber 45. A portion of the fluid in the chamber 45 passes through the metering orifice 126 and the crossover passageway 23 to the fan blades 29 carried by the end section 12 and is expelled into low pressure chamber 31. The impeller assembly 36 carried by the end section 12 forces the fluid into the high pressure chamber 46. A portion of this fluid under pressure passes through the metering orifice 127 and the crossover passageway 22 to the blades 29 of the end section 11 and enters the low pressure chamber 30 to complete a series fluid circuit.

When the rotating assembly is centered with respect to the support member 54 and 55, the pressures within the opposite pairs of the pressure chambers (45–46 and 30–31) are equal, and equal and opposite end forces are exerted on the end sections 11 and 12 by the fluid bearings. The rotating assembly is maintained in its centered relation. For example, the forces exerted on the end portions 38 of the impeller assemblies 36 by the fluid under pressure in the spaces 51 are equal and opposed. The main forces exerted by the fluid bearings are shown by arrows 131 in FIGURE 5 of the drawings. The fluid within the low pressure chambers 30 and 31 is at the same pressure and no fluid flow occurs in the circumferential motor slot 35.

In the event that the rotating assembly is moved longitudinally with respect to the support members, due to a shock force, for example, the fluid system generates forces which move the rotating assembly back to its centered position. This arrangement is shown in FIGURE 6 of the drawings where the magnetic drum is depicted as being displaced to the left with respect to the support members. The size of the metering orifice 126 associated with the end section 11 is reduced while the metering orifice 127 is enlarged. Similarly, space 58 providing the outer end thrust bearing for end section 11 is restricted while the space 58 associated with the end section 12 is enlarged. This substantially reduces the flow of fluid from the high pressure chamber 45 through the metering orifice 126 and the crossover passageway 23 to the low pressure chamber 31. However, the fluid flow from the high pressure chamber 46, through the crossover passageway 20 and to the low pressure chamber 30 is greatly increased when the metering orifice 127 is opened.

The pressure within the high pressure chamber 45 is quickly increased above the pressure in the high pressure chamber 46. The fluid pressure in the low pressure chamber 30 is also greater than the fluid pressure in the low pressure chamber 31. All of the impeller assemblies operate in series to very quickly provide substantial pressure differentials between the pairs of high and low pressure chambers. The fluid under pressure within the high pressure chamber 45 acts against the radially extending areas of the end section 11 to produce forces tending to move the rotating assembly to the right. These forces are greater than the counteracting forces applied against the end section 12 due to the above-mentioned pressure differential between the high pressure chambers and the rotating assembly is moved back into its original centered position.

A pressure differential also exists between the low pressure chambers 30 and 31 with the chamber 30 assuming a higher pressure in response to the closing and opening of the metering orifices 126 and 127, respectively. Fluid is forced to flow at a very high velocity through the motor slot 35 to the low pressure chamber 31. The motor slot 35 is quite thin and of substantial length whereby the fluid rushes past the side walls of this slot at relatively high velocities and large friction forces are developed. These friction forces act in a direction which moves the rotating assembly back to its centered position and are represented by the arrows 132 in FIGURE 6 of the drawings.

The arrangement is such that the fluid circuits are operative to maintain the drum in its centered position and to generate restoring forces when the rotating assembly is displaced. While the above discussion relates to a displacement of the rotating assembly to the left, the apparatus is operative in the same general manner to restore the magnetic drum to its centered position when the same has been displaced to the right. A very stable magnetic drum assembly is provided which is not adversely affected by shock forces.

In the event that an extremely large impact force is applied to the magnetic drum assembly which momentarily overrides the fluid bearings, a mechanical bearing means is operative to limit the movement of the rotating assembly. If the rotating assembly continues to move to the left, the ball 20 on the left end of the shaft 19 will engage the end 66 of the abutment rod 65 associated with the end section 11. A positive mechanical bearing is provided which prevents damage to the apparatus and is operative until the fluid forces regain control and recenter the rotating assembly.

The relative spacing between the balls 20 and the bearing surfaces 66 determines to what extent the metering orifices 126 and 127 can be opened or closed. It is preferred that the abutment rods 65 be adjusted so that the balls 20 engage the bearing surfaces 66 just before the side walls defining the metering orifices 126 and 127 engage each other. In this manner maximum utilization is made of the fluid system without damage to the apparatus.

In the above discussion it has been assumed that the magnetic drum is rotating at an operating speed. During starting and stopping of the magnetic drum or at any other time the speed thereof is reduced below a predetermined value, the end sections are supported in centered relation by the roller bearings 85 and the transducer heads are maintained in their raised positions with balls 20 reducing the lateral friction to a minimum.

While it is possible to use many types of fluids in the magnetic drum assembly, it is preferred that a compressible fluid, such as air, be employed. A compressible fluid offers advantages in that the fluid acts in the manner of a shock absorber to provide a resilient cushion which reacts against the magnetic drum when the same is displaced from its centered position. The fluid in the end space 58 associated with the closed metering orifice 126 or 127 is trapped within this space and compressed when the magnetic drum is moved. A fluid may be selected to provide maximum cooling of the electronic modules 121 and/or for its resistance to environmental conditions.

It should now be apparent that the objects initially set forth have been accomplished. Of particular importance is the provision of a magnetic drum assembly wherein the magnetic drum is supported by fluid bearings and the fluid under pressure is developed internally of the assembly. Fluid circuits are incorporated which maintain and automatically restore the magnetic drum in centered relation with respect to the supporting structure therefor.

While the invention has been particularly shown and described with reference to a preferred embodiment thereof, it will be understood by those skilled in the art that the foregoing and other changes in form and details may be made therein without departing from the spirit and scope of the present invention.

What is claimed is:

1. A magnetic drum assembly comprising a generally cylindrical magnetic drum having a magnetizable outer periphery, a support member nestingly received in closely spaced relation within said magnetic drum to define a pair of end spaces and a longitudinal generally circumferential space between said support member and said magnetic drum, said end spaces being positioned at the ends of and extending generally normally to said longitudinal space, a high pressure chamber, impeller means mounted on and rotatable with said magnetic drum, said impeller means forcing fluid into said high pressure chamber when said magnetic drum is rotated, and passageway means interconnecting said high pressure chamber and said spaces to provide longitudinal and end thrust fluid bearings for supporting said magnetic drum from said support member.

2. Apparatus according to claim 1 characterized in that said support member comprises a wall member, a low pressure chamber, said wall member separating said low pressure chamber and said high pressure chamber, a recess in said wall member, said impeller means being nestingly received and rotating in said recess, second passageway means in said wall member leading from said low pressure chamber to one side of said recess, third passageway means in said wall member leading from the other side of said recess to said high pressure chamber, and said impeller means drawing fluid from said low pressure chamber and forcing the same to said high pressure chamber when said magnetic drum is rotated.

3. Apparatus according to claim 2 characterized in that the space between said impeller means and said recess defines one of said end spaces, and the first-mentioned passageway means comprising orifice means extending through said wall member to permit fluid under pressure to flow from said high pressure chamber to said one of said end spaces.

4. A magnetic drum assembly comprising a magnetic drum having a magnetizable outer periphery for storing information quantities used in data processing apparatus, a support member, said magnetic drum and said support member being disposed in closely adjacent spaced relation to define a space therebetween, means for moving said magnetic drum, impeller means mounted from and movable with said magnetic drum, a high pressure chamber, said impeller means forcing fluid into said high pressure chamber when said drum is moving, and passageway means interconnecting said high pressure chamber with said space to provide a fluid bearing supporting the moving magnetic drum from said support member.

5. Apparatus according to claim 4 further comprising mechanical means for supporting said magnetic drum, and means to position said mechanical means for supporting with respect to said magnetic drum.

6. Apparatus according to claim 5 characterized in that mechanical means comprises a bearing surface on said magnetic drum, mechanical bearings for engaging said bearing surface, a movable wall for said high pressure chamber, said wall moving in response to the pressure within said high pressure chamber, and said means to position comprising means interconnecting said mechanical bearings and said wall.

7. Apparatus according to claim 6 characterized in that said means interconnecting comprises a bell crank lever having a plurality of arms, one of said arms mounting said bearing means, a cam movable with said wall, a second of said arms mounting a cam follower means, a yieldable means extending between a third of said arms and said wall, said yieldable means maintaining said cam follower means against said cam and applying a biasing force to said wall in opposition to the forces exerted on said wall by the fluid in said high pressure chamber.

8. Apparatus according to claim 6 further comprising a transducer head positioned in transducing relation with respect to said magnetizable surface, a laminar film of fluid about said moving magnetic drum, said transducer head adapted to be supported on the laminar film of fluid surrounding said moving magnetic drum, means to position said transducer head with respect to said magnetic drum, and means interconnecting said means to position said transducer head with said movable wall.

9. A magnetic drum assembly comprising a magnetic drum having a magnetizable outer periphery for storing information quantities used in data processing apparatus, means for rotating said magnetic drum, a support member, said magnetic drum and said support member being disposed in adjacent spaced relation to define a space therebetween, a source of fluid under pressure, conduit means connecting said source and said space to provide a fluid bearing for supporting said rotating magnetic drum, mechanical means supporting said magnetic drum for rotation, means to retract said mechanical means, a transducer head movably mounted in adjacent relation with respect to said magnetizable outer periphery of said magnetic drum, means to position said transducer head with respect to said magnetic drum, and said means to position and said means to retract comprising a member movable in response to the pressure of the fluid in said source.

10. A magnetic drum assembly comprising a magnetic drum having a magnetizable outer periphery for storing information quantities used in data processing apparatus, means for rotating said magnetic drum, an impeller assembly mounted from and rotatable with said magnetic drum, a high pressure chamber, said impeller assembly forcing fluid to said high pressure chamber when said magnetic drum is rotated, a transducer head positioned adjacent said magnetizable outer periphery of said magnetic drum, a laminar film of fluid about said outer periphery of said magnetic drum, said transducer head comprising a shoe member adapted to ride on the laminar film of fluid about said rotating magnetic drum, means to position said transducer head with respect to said magnetic drum, and said means to position comprising a member movable in response to the pressure of the fluid in said high pressure chamber.

11. A magnetic drum assembly comprising a magnetic drum having a magnetizable outer periphery for storing information quantities used in data processing apparatus, means for rotating said magnetic drum, an impeller assembly mounted from and rotatable with said magnetic drum, a high pressure chamber, said impeller assembly forcing fluid to said high pressure chamber when said magnetic drum is rotating, a plurality of heat radiating elements disposed in spaced relation with respect to said magnetic drum, and passageway means for conveying at least a portion of the fluid within said high pressure chamber to said heat radiating elements for cooling the same.

12. A mechanical assembly comprising a support member, a rotatable member, an axis, means to rotate said rotatable member about said axis, said support member and said rotatable member being disposed in adjacent spaced relation to define a pair of spaces adjacent opposite end portions of said rotatable member, said spaces extending generally normal to said axis, means for supplying fluid under pressure to said spaces, the fluid under pressure in said spaces positioning said rotatable member along said axis with respect to said support member, said means to supply comprising a metering orifice associated with each of said space, and means to open and close the metering orifices in response to the relative position between said support member and said rotatable member so as to change the relative pressure of the fluid in said spaces.

13. A magnetic drum assembly comprising a magnetic drum, said magnetic drum having a pair of generally cylindrical end sections, each of said end sections having a magnetizable outer periphery for the storage of information quantities used in data processing apparatus, drive means for rotating said end sections, said drive means comprising a rotatable part, said end sections being disposed in symmetrical relation with respect to and on opposite sides of said rotatable part to define a mechanically balanced rotatable assembly, support members, bearing means for rotatably supporting said rotatable assembly from said support members, said bearing means comprising spaces between said end sections and said support members, a high pressure chamber and a low pressure chamber associated with each of said end sections, first passageway means interconnecting said high pressure chambers with said spaces, second passageway means interconnecting the high and low pressure chambers associated with each of said end sections, impeller means mounted from and rotatable with said end sections, and said impeller means forcing fluid from said low pressure chambers through said second passageway means to said high pressure chambers and then through said first passageway means to said spaces to define fluid bearings for supporting said rotatable assembly.

14. Apparatus according to claim 13 further comprising crossover passageway means interconnecting each of said high pressure chambers with the low pressure chamber associated with the opposite one of said end sections, said crossover passageway means each having a metering orifice disposed therein which is opened and closed in response to the relative positions of said rotatable assembly and said support members, second impeller means mounted on and rotatable with said end sections, and said second impeller means forcing fluid through said crossover passageway means when said magnetic drum is rotating.

15. A magnetic drum assembly comprising a pair of cylindrical end sections having magnetizable outer peripheries for the storage of information quantities used in data processing apparatus, support members nestingly received within said end sections to define spaces between said support members and said end sections, means to supply fluid under pressure to said spaces to define fluid bearings, said means to supply comprising a metering orifice associated with each of said end sections, means to open and close the metering orifices in response to the longitudinal position of said end sections with respect to said support members, and said means to open and close resulting in fluid forces tending to maintain said end sections and said support members in preset spaced relation.

16. A magnetic drum assembly comprising a pair of generally cylindrical end sections having magnetizable outer peripheries for the storage of information quantities used in data processing apparatus, a rotatable member, said end sections being disposed in symmetrical relation with respect to and on opposite sides of said rotatable part to define a rotatable assembly, a support member, means to support said rotatable assembly from said support member, means to rotate said rotatable assembly, a pressure chamber associated with each of said end sections, means to supply fluid under pressure to the chambers, the fluid in said chambers exerting opposed moving forces on said end sections, said means to supply comprising a metering orifice associated with each of said chambers, means to open and close the metering orifices in response to relative movement between said support member and said rotatable assembly, and said means to open and close resulting in forces tending to maintain said rotatable assembly in preset relation with respect to said support member.

17. Apparatus according to claim 16 characterized in that said means supporting comprises a plurality of fluid bearings, overriding means to support said rotatable assembly upon relative movement between said rotatable assembly and said support member, and said overriding means comprising cooperating bearings and bearing surfaces on said rotatable assembly and said support member.

18. Apparatus according to claim 16 characterized in that said means to rotate comprises a rotor and a stator, said rotatable part comprising said rotor, a slot between said stator and rotor, a pair of pressure chambers disposed on opposite sides of means to rotate, said slot interconnecting said pressure chambers, the pressure in said pressure chambers being equal when said rotatable assembly and said support member are maintained in said preset relation, and the fluid flow in said slot in response to variations in pressure in said pressure chambers developing forces tending to maintain said rotatable assembly in said preset relation with respect to said support member.

References Cited

UNITED STATES PATENTS

| | | | |
|---|---|---|---|
| 3,029,416 | 4/1962 | Quade | 340—174.1 |

| | | | |
|---|---|---|---|
| 2,671,700 | 3/1954 | Seyffert | 340—174.1 |
| 3,005,675 | 10/1961 | Ledin et al | 340—174.1 |
| 2,729,106 | 1/1956 | Mathiesen | 340—174.1 |
| 2,602,632 | 7/1952 | Serduke et al | 340—174.1 |
| 2,854,298 | 1/1956 | Baumeister | 340—174.1 |

TERRELL W. FEARS, *Primary Examiner*

IRVING S. SRAGOW, *Examiner.*

S. M. URYNOWICZ, *Assistant Examiner.*